(12) United States Patent
Gallarelli et al.

(10) Patent No.: US 6,801,434 B2
(45) Date of Patent: Oct. 5, 2004

(54) COMPUTER MODULE WITH INTEGRATED COVER LATCHING AND ATTACHMENT MECHANISM

(75) Inventors: Pat Gallarelli, Pittsboro, NC (US); Kevin Duane Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 10/252,658

(22) Filed: Sep. 23, 2002

(65) Prior Publication Data

US 2004/0057219 A1 Mar. 25, 2004

(51) Int. Cl.[7] .............................................. H05K 7/00
(52) U.S. Cl. .................. 361/747; 361/740; 361/759; 361/801; 361/726; 361/732; 439/372
(58) Field of Search .............................. 361/726, 732, 361/728–730, 740, 741, 747, 752, 759, 754–756, 796–798, 801; 439/472, 327, 157; 211/26.2, 41.17; 312/223.1, 223.2

(56) References Cited

U.S. PATENT DOCUMENTS

| | | | | |
|---|---|---|---|---|
| 3,644,868 A | * | 2/1972 | Nevala | 439/61 |
| 4,006,955 A | * | 2/1977 | Johnson | 439/327 |
| 5,967,825 A | * | 10/1999 | Lima et al. | 439/372 |
| 6,243,273 B1 | * | 6/2001 | Beun et al. | 361/796 |
| 6,354,858 B1 | * | 3/2002 | Cooper et al. | 439/327 |
| 6,366,457 B1 | * | 4/2002 | Otto et al. | 361/685 |
| 6,413,594 B1 | * | 7/2002 | Onishi | 428/7 |
| 6,442,037 B1 | * | 8/2002 | Boe | 361/759 |
| 6,517,369 B1 | * | 2/2003 | Butterbaugh et al. | 439/327 |
| 6,603,664 B1 | * | 8/2003 | Gallarelli et al. | 361/747 |

\* cited by examiner

*Primary Examiner*—David Martin
*Assistant Examiner*—Dameon E. Levi

(57) ABSTRACT

An electronic circuits module includes a cover and a base. A lever and cam assembly is rotatably attached to the cover, and the cam includes first and second lobes. The lever and cam assembly is rotatable between first, second and third positions. In the first position, the first lobe can be inserted through an eccentric opening in the base, and then rotated to the second position to lock the cover to the base. In the third position, the module can be inserted into the computer and when the lever and cam assembly is moved back to the second position, the second lobe locks the module in the computer. A mechanism in the computer inhibits the movement of the lever and cam assembly into the first position, thereby preventing the disconnection of the base from the cover when the module is installed in the computer.

8 Claims, 6 Drawing Sheets

COMPUTER MODULE WITH INTEGRATED COVER LATCHING AND ATTACHMENT MECHANISM

CROSS REFERENCE TO RELATED APPLICATIONS

This application is related to an application Ser. No. 10/252,280 entitled "Computer System Having Removable and Stackable Modules" filed on the same date as the instant application. This related application is incorporated by reference into the instant application.

BACKGROUND OF THE INVENTION

This invention pertains to computers and other information processing, electronic and electrical systems. More particularly, this invention pertains to a removable module having a mechanism that both latches the module's cover to its base and also attaches the module to the system chassis.

The invention described below provides for a modular computer or other electrical equipment chassis in which a single mechanism is used to both hold the module base and cover together, as well as to secure the module in the chassis such that the module's connectors are locked to the mating connectors of the chassis. In addition, this mechanism inhibits the separation of the module base and cover when the module is properly installed in the chassis. This mechanism requires no tools to remove the module from the chassis, nor are any tools required to separate the module's base from its cover once the module has been removed from the chassis.

SUMMARY OF THE INVENTION

Briefly, the invention is a module for housing electronic components for use in a computer having a cam lobe engaging mechanism. The module includes a lever and cam assembly comprising a lever arm attached to a cam shaft. The cam shaft has first and second lobes, and the lever and cam assembly is rotatable between first, second and third positions. The module includes a cover having a cam shaft retaining mechanism for attaching the cam shaft to the cover while permitting the lever and cam assembly to rotate between these three positions. A module base includes a slot for receiving the first lobe of the cam shaft. The slot has an eccentric shape such that the first lobe of the cam can be inserted into the slot when the lever and cam assembly is in the first position, and such that the first lobe engages the base to lock the cover to the base when the lever and cam assembly is in the second and third positions. Thus, the cover can be locked to and unlocked from the base depending on the position of the lever and cam assembly. The second cam lobe is adapted to engage the cam lobe engaging mechanism of the computer when the lever and cam assembly is in the second position to lock the module to the computer, and the second cam lobe is adapted to disengage the cam lobe engaging mechanism when the lever and cam assembly is in the third position to unlock the module from the computer, such that the module can be locked to and unlocked from the computer depending on the position of the lever and cam assembly.

In another embodiment, the invention is a module for housing electrical components for use in an electrical system having a cam lobe engaging mechanism. The module includes a lever and cam assembly comprising a lever arm attached to a cam shaft. The cam shaft has first and second lobes, and the lever and cam assembly is movable between first, second and third positions. A first housing portion includes a cam shaft retaining mechanism for attaching the cam shaft to the first housing portion while permitting the lever and cam assembly to move between the first, second and third positions. Also included is a second housing portion. The first lobe of the cam shaft engages the second housing portion to lock the first housing portion to the second housing portion when the lever and cam assembly is in the second and third positions. Thus, the first housing portion can be locked to and unlocked from the second housing portion depending on the position of the lever and cam assembly. The second cam lobe is adapted to engage the cam lobe engaging mechanism of the electrical system when the lever and cam assembly is in the second position to lock the module to the electrical system, and the second cam lobe is adapted to disengage the cam lobe engaging mechanism when the lever and cam assembly is in the third position to unlock the module from the electrical system, such that the module can be locked to and unlocked from the electrical system depending on the position of the lever and cam assembly.

DESCRIPTION OF THE ILLUSTRATIVE EMBODIMENTS

Figure 1:
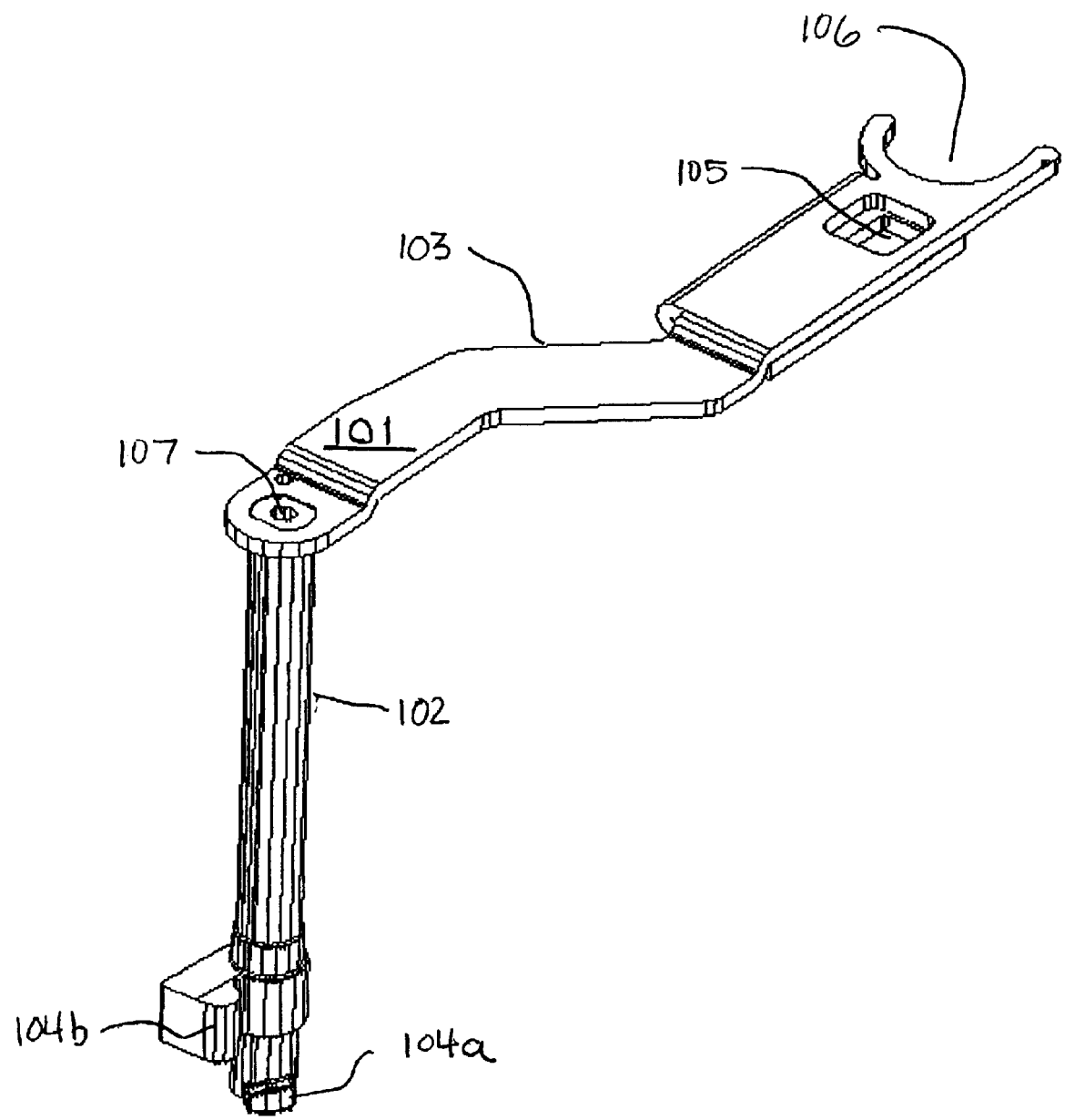
FIG. 1 is a perspective view of the lever and cam assembly.

Referring to FIG. 1, lever and cam assembly 101 includes cam shaft 102 having a lever arm 103 attached at one end of the cam shaft. Cam shaft 102 includes cam lobes 104a and 104b, which are spaced apart "vertically" (ie, longitudinally along cam shaft 102). Lever arm 103 includes latch hole 105 for receiving a latching tab to be described in more detail below. Lever arm 103 also includes finger hole 106, which aids in the movement of the lever arm one position to another. A threaded hole 107 receives a bolt 207 (see FIG. 2) for securing arm 103 to cam shaft 102. Other well know methods of attaching an arm to a shaft may also be used.

Figure 2:
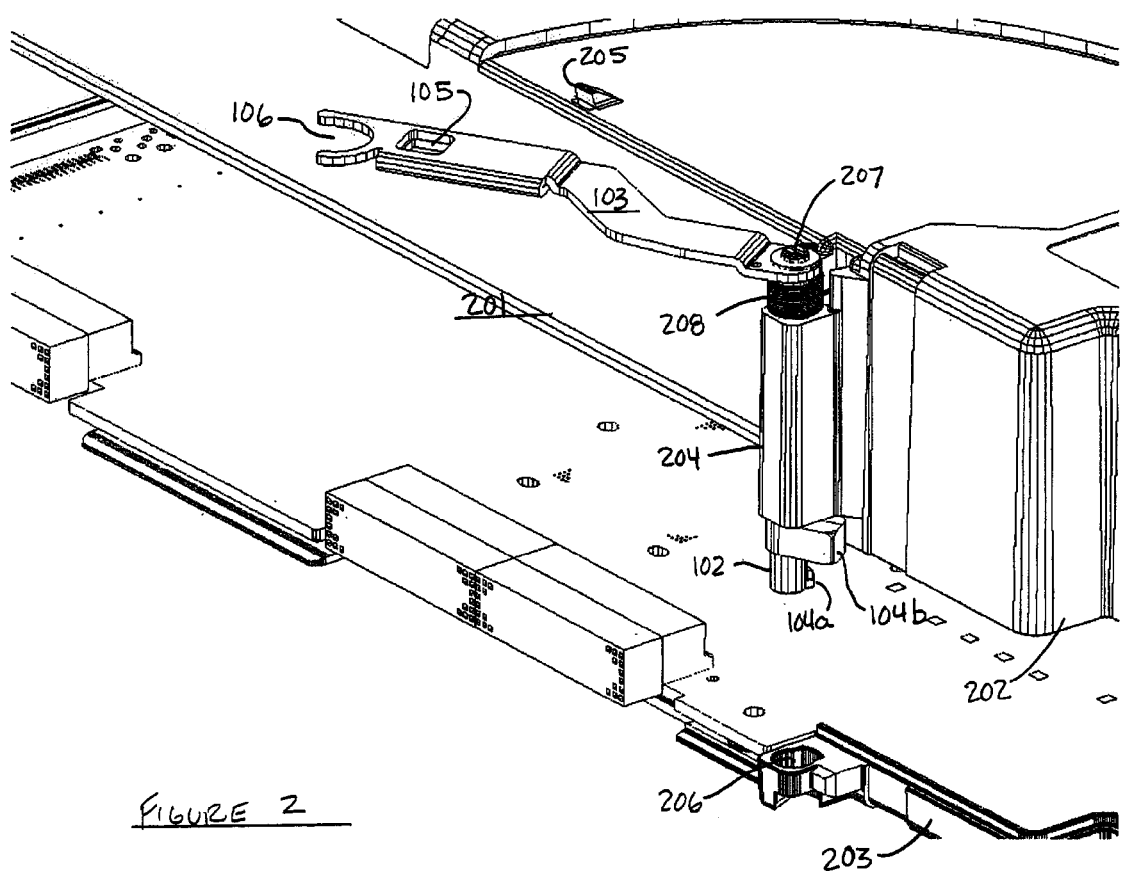
FIG. 2 is a perspective view of the module of the present invention illustrating the module cover separated from the base, as well as the multi-lobed lever and cam assembly in the first position.
Figure 3:
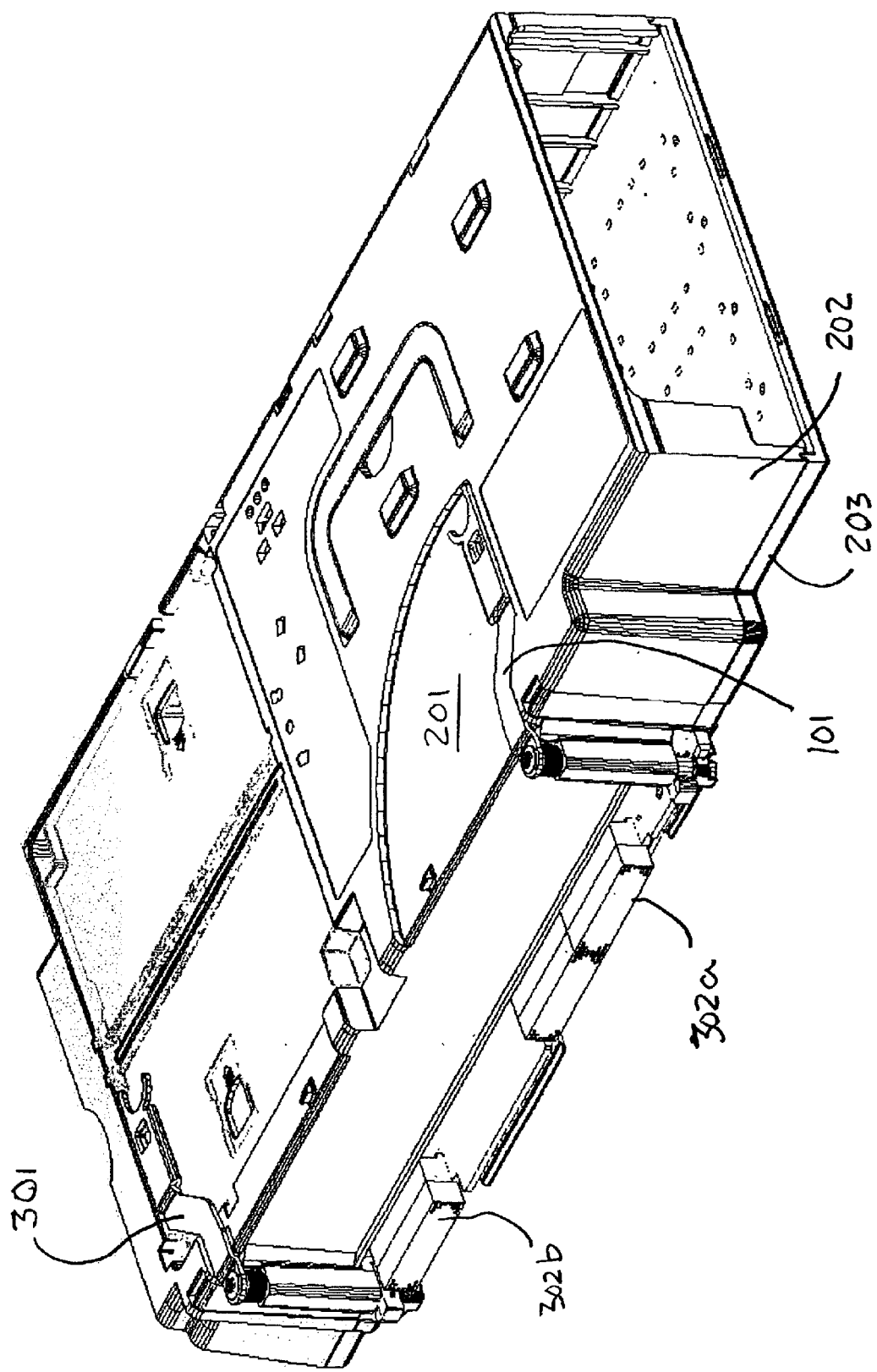
FIG. 3 is a perspective view of the module of the present invention illustrating the module cover attached to the base, with the lever and cam assembly in the third position.

FIG. 2 is a perspective view of module 201 wherein module cover 202 is separated from module base 203, and lever and cam assembly 101 is in the first position. Referring to this figure, module 201 includes cover 202 and base 203. Cover 202 includes a boss 204 having an elongated cylindrical hole to receive cam shaft 102 while permitting the cam to rotate within the boss. A torsion spring 208 biases lever and cam assembly 101 towards the third or "rear"

position (which is illustrated in FIG. 3), requiring a small degree of force to manually move lever 103 to the second and first positions. (The first position is the "forward" position illustrated in FIG. 2, while the second or "middle" position occurs when arm 103 is positioned such that tab 205 is engaged in hole 105.) During assembly, cam shaft 102 is first inserted into the hole in boss 204, torsion spring 208 is placed over the top of shaft 102, and then lever arm 103 is attached to the shaft by turning bolt 207 into threaded hole 107.

A latch tab 205 engages latch hole 105 in lever arm 103 to releasably lock lever and cam assembly 101 in the second or "middle" position. Other well known latching mechanisms may also be substituted for latch hole 105 and latch tab 205. When lever arm 103 is in the second position, lifting the lever arm slightly causes latch tab 205 to be disengaged from latch hole 105, thereby permitting the lever arm to be moved to the first or third positions (unless otherwise inhibited).

FIG. 3 is a perspective view of module 201 wherein module cover 202 is attached to base 203, and lever and cam assembly 101 is in the third or "rear" position.

Referring to this figure, cover 202 is locked to base 203 when arm and cam assembly 101 is in the third position, as well as the second position. Preferably, a second lever arm and cam shaft assembly 301 is used, although the invention may be practiced with only one such assembly. Second lever arm and cam assembly 301 is a mirror image of assembly 101, but is otherwise substantially similar. Connectors 302a and 302b are accessible from the lever and cam assembly side of module 201.

Figure 4:
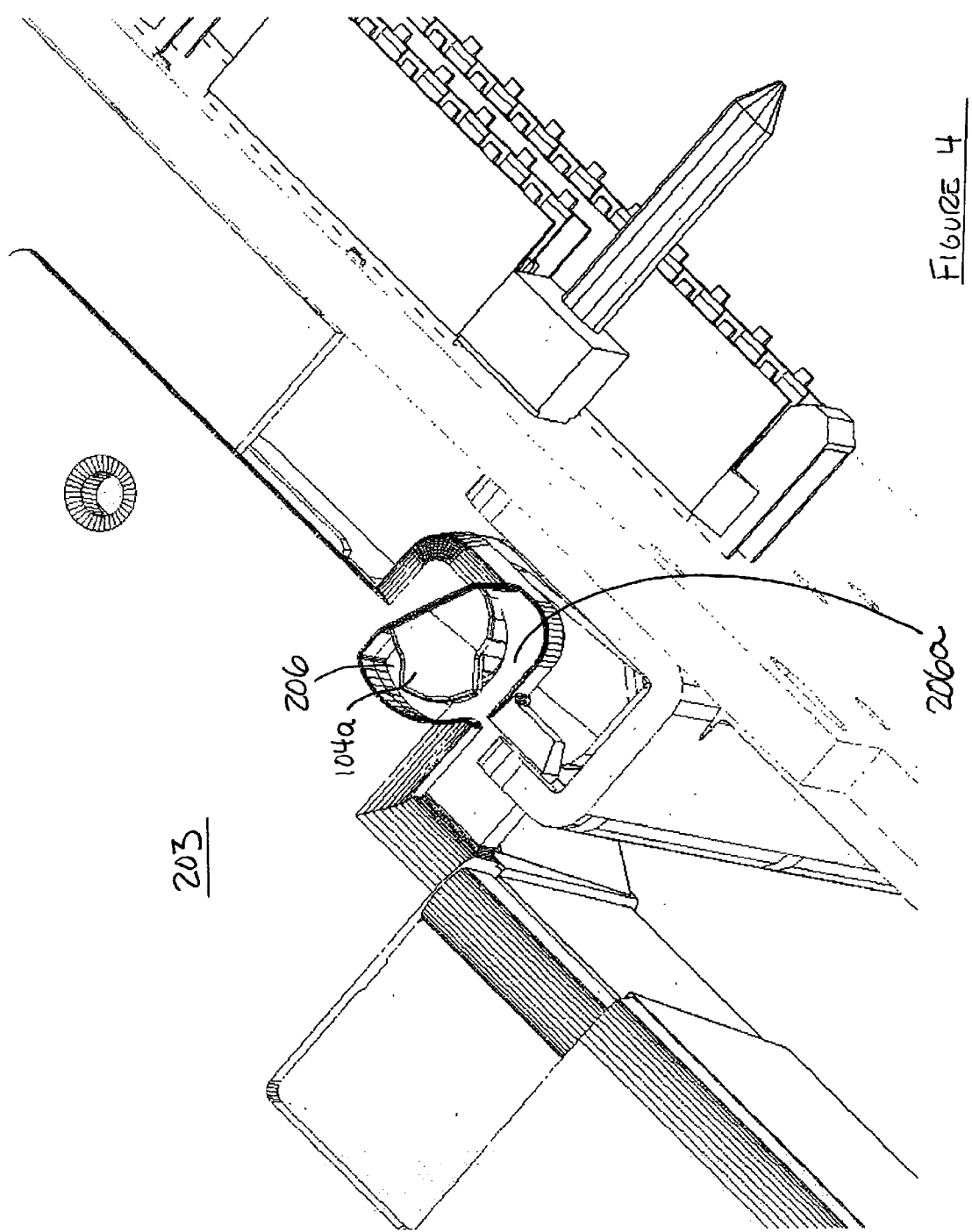
FIG. 4 is a perspective view of the bottom of the module illustrating the first ("lower") lobe of the cam and the eccentric retaining hole of the module base, in which the lever and cam assembly is in the second position such that the base is secured to the cover.

FIG. 4 is a perspective view of the bottom of module 201 illustrating first cam lobe 104a and eccentric retaining hole 206 of module base 203 in which lever and cam assembly 101 is in the second position such that the base is secured to module cover 202. Referring to FIGS. 2 and 4, base 203 includes an eccentric hole 206 for receiving lower cam lobe 104a. Lower lobe 104a is designed to pass through eccentric hole 206 in base 203 only when lever and cam assembly 101 is in the first or "forward" position. To attach base 203 to cover 202, lever arm 103 is moved to the first position, and then cam lobe 104a is inserted into eccentric hole 206. Next, lever arm 103 is moved to the second or third position, which causes cam lobe 104a to engage a lip 206a around hole 206, thereby locking cover 202 to base 203.

Figure 5:
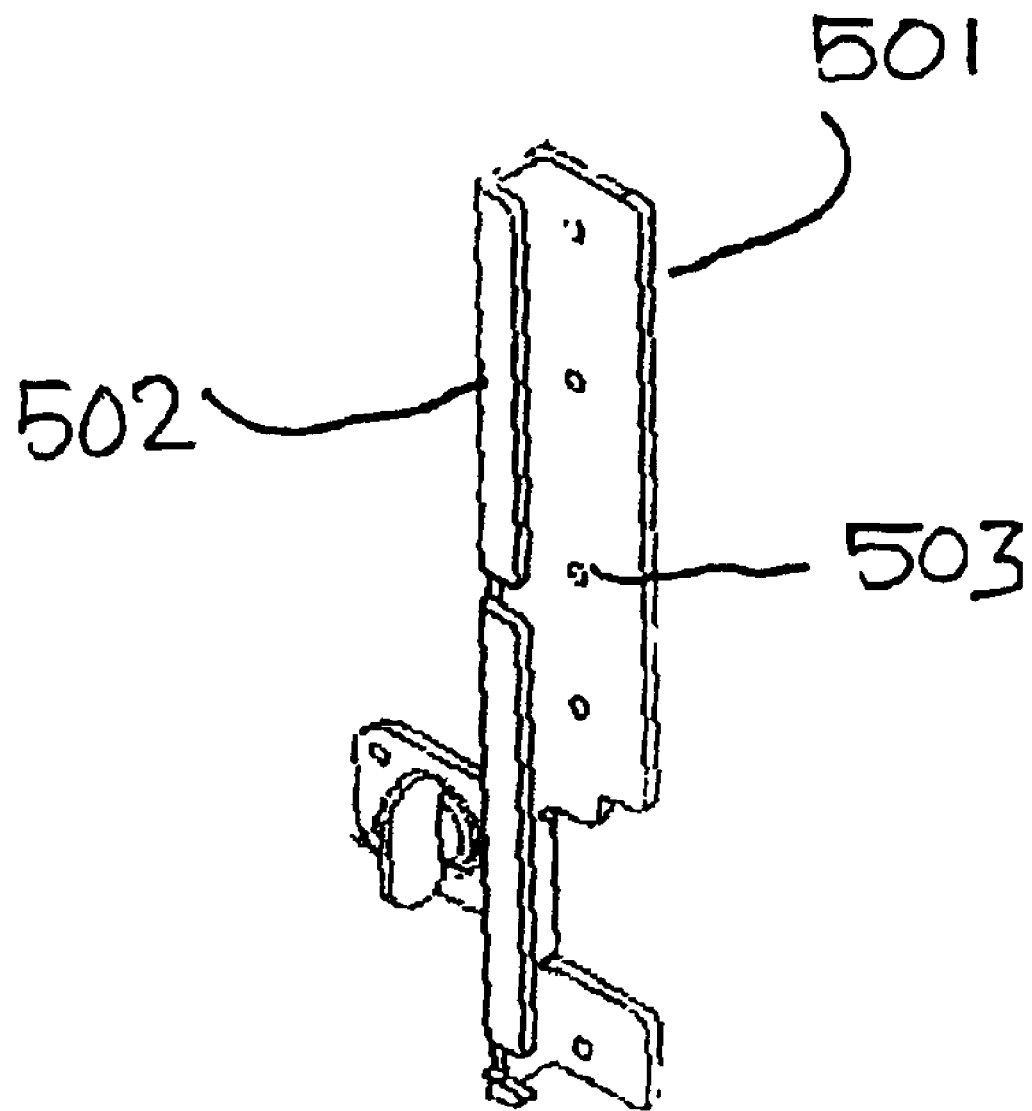
FIG. 5 is a perspective view of the cam lobe engaging mechanism.

FIG. 5 is a perspective view of cam lobe engaging mechanism 501. Referring to this figure, cam lobe engaging mechanism 501 is generally "U" shaped in cross section and includes a lip 502 that preferably extends the full length of the mechanism. Holes 503 are provided for attaching the cam lobe engaging mechanism directly to a computer or other electrical system chassis, or indirectly to a printed circuit board attached to the chassis.

Figure 6:
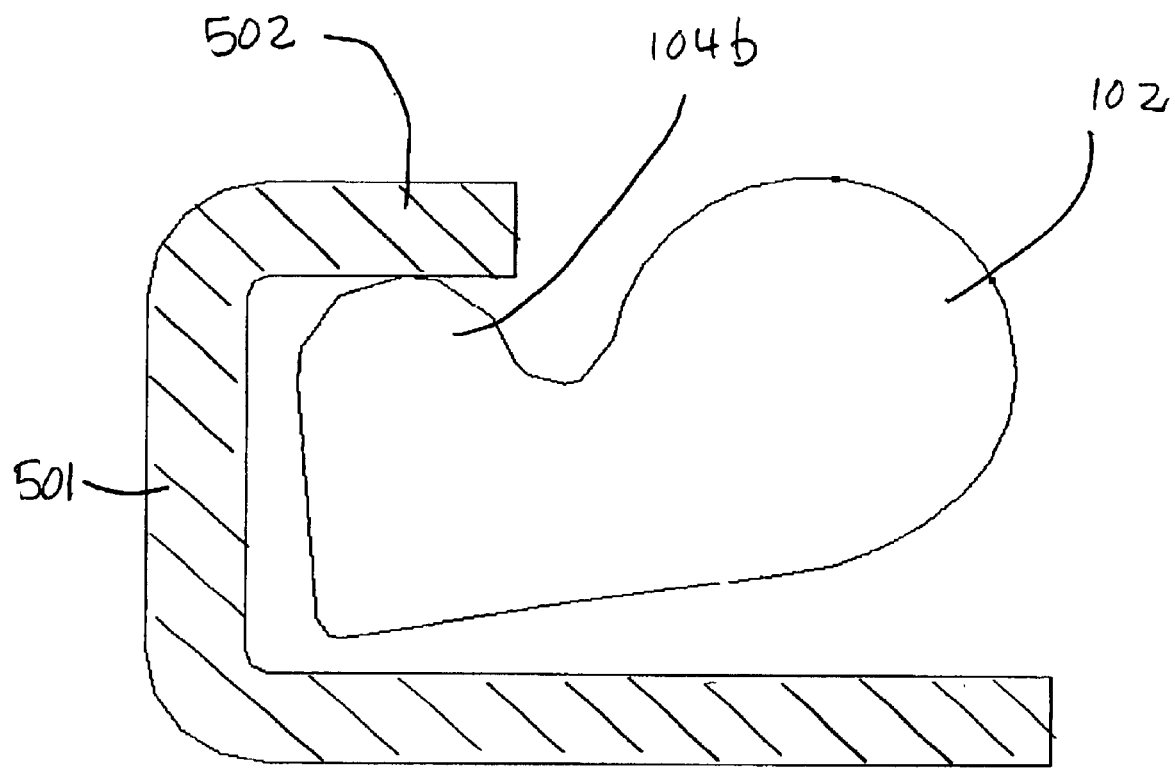
FIG. 6 is a partial sectional view illustrating the upper cam lobe of the lever and cam assembly engaging the lip of the cam lobe engaging mechanism when the lever and cam assembly is in the second position.

FIG. 6 is a partial cross sectional view of cam lobe engaging mechanism and cam shaft 102, wherein lever and cam assembly 101 is illustrated in the second position. Referring to this figure, it should noted that upper cam lobe 104b is in contact with the inner surface of lip 502 of mechanism 501. This occurs when arm and cam shaft assembly 101 is in the second position. When installing module 201 into an electrical equipment chassis, lever and cam assembly 101 is moved to the third position and then the module is inserted into the chassis. Next, lever and cam assembly 101 is moved to the second position as illustrated in FIG. 6, thereby securing module 201 in the chassis. It should be noted that when lever and cam assembly is in the second position and cam lobe 104b is engaged against the inner surface of lip 502, the lever and arm assembly cannot be moved to the first position, thereby preventing module base 203 from being unlocked from module cover 202.

We claim as our invention:

1. A module for housing electronic components, said module for use in an electrical system having a cam lobe engaging mechanism, said module comprising:
   a lever and cam assembly comprising a lever arm attached to a cam shaft, said cam shaft having first and second lobes, said lever and cam assembly being rotatable between first, second and third positions;
   a cover including a cam shaft retaining mechanism for attaching said cam shaft to said cover while permitting said lever and cam assembly to rotate between said first, second and third positions;
   a base including a slot for receiving said first lobe of said cam shaft, said slot having an eccentric shape such that said first lobe can be inserted into said slot when said lever and cam assembly is in said first position, and such that said first lobe engages said base to lock said cover to said base when said lever and cam assembly is in said second and third positions, whereby said cover can be locked to and unlocked from said base depending on the position of said lever and cam assembly;
   wherein said second cam lobe is adapted to engage the cam lobe engaging mechanism of the electrical system when said lever and cam assembly is in said second position to lock said module to the electrical system, and said second cam lobe is adapted to disengage the cam lobe engaging mechanism when said lever and cam assembly is in said third position to unlock said module from the electrical system, whereby said module can be locked to and unlocked from the electrical system depending on the position of said lever and cam assembly.

2. The module of claim 1, wherein said second cam lobe is adapted to engage the cam lobe engaging mechanism of the electrical system when said lever and cam assembly is in said second position to inhibit the movement of said lever and cam assembly into said first position, thereby inhibiting the detachment of said base from said cover when said module is locked to the electrical system.

3. The module of claim 1, further comprising a latching mechanism for latching said lever and cam assembly in said second position.

4. The module of claim 2, further comprising a latching mechanism attached to said cover for latching said lever and cam assembly in said second position.

5. A module for use in an electrical system having a cam lobe engaging mechanism, said module comprising:
   a lever and cam assembly comprising a lever arm attached to a cam shaft, said cam shaft having first and second lobes, said lever and cam assembly being movable between first, second and third positions;
   a first housing portion including a cam shaft retaining mechanism for attaching said cam shaft to said first housing portion while permitting said lever and cam assembly to move between said first, second and third positions;
   a second housing portion, said first lobe of said cam shaft engaging said second housing portion to lock said first housing portion to said second housing portion when said lever and cam assembly is in said second and third positions, whereby said first housing portion can be locked to and unlocked from said second housing portion depending on the position of said lever and cam assembly;

wherein said second cam lobe is adapted to engage the cam lobe engaging mechanism of the electrical system when said lever and cam assembly is in said second position to lock said module to the electrical system, and said second cam lobe is adapted to disengage the cam lobe engaging mechanism when said lever and cam assembly is in said third position to unlock said module from the electrical system, whereby said module can be locked to and unlocked from the electrical system depending on the position of said lever and cam assembly.

6. The module of claim 5, wherein said second cam lobe is adapted to engage the cam lobe engaging mechanism of the electrical system when said lever and cam assembly is in said second position to inhibit the movement of said lever and cam assembly into said first position, thereby inhibiting the detachment of said second housing portion from said first housing portion when said module is locked to the electrical system.

7. The module of claim 5, further comprising a latching mechanism for latching said lever and cam assembly in said second position.

8. The module of claim 6, further comprising a latching mechanism attached to said first housing portion for latching said lever and cam assembly in said second position.

* * * * *